United States Patent
Kutcher et al.

(10) Patent No.: US 9,814,345 B2
(45) Date of Patent: Nov. 14, 2017

(54) BABY FORMULA PREPARATION WITH WARMING SYSTEM AND CUSTOMIZED PODS

(71) Applicant: Miravan, LLC, Holliston, MA (US)

(72) Inventors: Miriam Kutcher, Holliston, MA (US); Evan Kutcher, Holliston, MA (US)

(73) Assignee: Miravan, LLC, Greenville, SC (US)

( * ) Notice: Subject to any disclaimer, the term of this patent is extended or adjusted under 35 U.S.C. 154(b) by 0 days.

(21) Appl. No.: 15/345,693

(22) Filed: Nov. 8, 2016

(65) Prior Publication Data

US 2017/0049262 A1    Feb. 23, 2017

Related U.S. Application Data

(63) Continuation of application No. 13/894,465, filed on May 15, 2013, now Pat. No. 9,486,103.

(60) Provisional application No. 61/654,029, filed on May 31, 2012, provisional application No. 61/733,004, filed on Dec. 4, 2012.

(51) Int. Cl.
| | |
|---|---|
| *A47J 31/40* | (2006.01) |
| *A23L 5/10* | (2016.01) |
| *A23L 2/38* | (2006.01) |

(52) U.S. Cl.
CPC ............ *A47J 31/407* (2013.01); *A23L 2/38* (2013.01); *A23L 5/13* (2016.08); *A23V 2002/00* (2013.01)

(58) Field of Classification Search
CPC .......... A47J 31/407; A47J 31/40; A23L 5/13; A23V 2002/00
See application file for complete search history.

(56) References Cited

U.S. PATENT DOCUMENTS

2013/0032612 A1*   2/2013   Armstrong ............ A47J 31/401
                                                                    222/129.4

\* cited by examiner

*Primary Examiner* — Erik Kashnikow
*Assistant Examiner* — Lela S Williams
(74) *Attorney, Agent, or Firm* — BainwoodHuang

(57) ABSTRACT

A technique for preparing baby formula includes containing an amount of powdered formula, premeasured to provide a single serving of baby formula, containing an amount of water, premeasured to provide at least a single serving of baby formula, heating the water, and dispensing both the premeasured formula and the water for providing a single serving into a bottle or other vessel when the water reaches a predetermined temperature.

6 Claims, 12 Drawing Sheets

BABY FORMULA PREPARATION WITH WARMING SYSTEM AND CUSTOMIZED PODS

Benefit is claimed to U.S. application Ser. No. 13/894,465, filed May 15, 2013, which itself claims the benefit of provisional application No. 61/654,029, filed May 31, 2012, and to provisional application No. 61/733,004, filed Dec. 4, 2012. The contents and teachings of these prior applications are hereby incorporated by reference in their entirety.

BACKGROUND

Parents and other infant caregivers use many methods for mixing and heating baby formula. Typically, a caregiver measures an amount of powdered formula and an amount of water, places the measured water and formula into a bottle, and shakes the bottle to mix the formula.

The water, or the mixed formula, may be heated on a stove top or in a microwave oven. Also, specialized bottle warmers have been developed, which use steam for heating bottled formula. Such bottle warmers may include a bottom compartment for holding water and a top compartment for receiving a bottle to be heated. To heat the bottle, the caregiver fills the bottom compartment with water, places a bottle in the top compartment, and plugs in the bottle warmer. The machine boils the water, and steam rises into the top compartment to gradually heat the bottle and its contents.

SUMMARY

Unfortunately, bottle warmers that use steam to heat baby formula can produce inconsistent results. The temperature of the heated formula can vary substantially, depending on the duration of heating and the initial temperature of the water. Also, since the formula is heated from the outside of the bottle, the temperature of the formula can vary from one region to another within the bottle. In addition, such steam-based bottle warmers tend to produce wet bottles, which are sometimes unpleasant to handle, both for caregiver and infant.

Microwave ovens can also produce inconsistently heated formula. Heating often depends upon the physical location within the microwave oven where the bottle is placed. Because microwave ovens operate using standing waves, certain regions within the bottle can reach very high temperatures, whereas other regions can remain relatively cool. In some cases, the hot regions of formula may be hot enough to cause displeasure to infants or even burns.

Conventional ranges can also produce inconsistent results and overly heated formula. In addition, conventional ranges are difficult to access and operate when caregivers are called upon in the middle of the night to respond to hungry infants.

In contrast with these prior approaches, an improved technique for preparing baby formula includes containing an amount of powdered formula, premeasured to provide a single serving of baby formula, containing an amount of water, premeasured to provide at least a single serving of baby formula, heating the water, and dispensing both the premeasured formula and the water for providing a single serving into a bottle or other vessel when the water reaches a predetermined temperature. An operator can then screw a nipple lid onto the bottle and shake the bottle manually to mix the water with the powder.

According to some examples, powdered formula is loaded into a pod. The pod has a cup for receiving a premeasured amount of powdered formula, a lid, and a hinge that couples the lid to the cup for allowing the lid to open and close. The loaded pod is closed, inverted, and placed into an apparatus. The apparatus is arranged to heat water to a designated temperature (e.g., 98.6 degrees F., or thereabouts) and to release the heated water into a bottle or other vessel when the water reaches the designated temperature. The apparatus is also configured to open the lid of the pod, causing substantially all of the powdered formula to fall into the bottle. The heated water and powdered formula can be dispensed simultaneously or sequentially.

In some examples, the apparatus has a top surface and the top surface has an opening. When a pod is loaded into the apparatus, a bottom of the inverted pod extends through the opening in the top surface so that the pod can be visualized by an operator. According to one variant, the pod, or a portion thereof, is made of a transparent material, to allow the contents of the pod to be seen by the operator. In some examples, the bottom of the pod, or a portion thereof, is transparent, so that the operator can look at the pod and readily see whether it contains powdered formula. In another example, the pod is predominantly opaque but includes a transparent region (i.e., a window) on the bottom of the pod or on a side of the pod, to enable the operator to visualize the pod's contents without having to remove the pod from the apparatus.

In some examples, the apparatus has a single button for operation. The operator loads water into the apparatus (e.g., using an integrated measuring cup), loads powder into the pod, inserts the pod into the apparatus, and pushes the button. The apparatus then heats the water and dispenses both the powder and the water. The button illuminates red during heating and turns green when heating is complete. The simple operation promotes reliable results. Caregivers can even prefill the machine with water and formula, e.g., before bed, so that only a single push button is needed to prepare formula when they are awakened during the night.

In some examples, water and powdered formula are kept separate until they are dispensed into the bottle. A funnel is provided for conveying powered formula from a pod above to the bottle below. The funnel has a bottom circumference that is approximately the same as, or slightly smaller than, the circumference of the top of the bottle. A recessed region is provided at the bottom of the funnel, within the bottom circumference, to provide space for a drain spout which releases heated water into the bottle. Separate dispensing paths for powdered formula and water are thus contained within the bottom circumference of the funnel, to allow powdered formula and water to be dispensed side-by-side into the bottle, but without direct interference with one another. Maintaining separate dispensing paths in this manner prevents contact between powdered formula and water within the apparatus and thus prevents powdered formula from moistening and adhering to the apparatus in the vicinity of the drain spout.

In some examples, the dispensing of heated water and powdered formula are initiated simultaneously. According to one variant, the heated water continues to be dispensed into the bottle after the powdered formula has been released into the bottle. Maintaining a flow of water after the release of powdered formula ensures that the water clears the drain spout of any powder that splashes back as a result of dispensing the powdered formula. In some variants, once the water reaches the predetermined temperature, powder is dispensed into the bottle before the heated water is dispensed. In other variants, e.g., where there is a low likelihood that powder will adhere to the drain spout, water is completely dispensed before powder is dispensed. Displacing these events in time further discourages any interaction between water and powder within the apparatus.

According to one aspect, a pod having a lid and containing powdered formula is held in an inverted position above a funnel, with the lid facing down. A bottle or other vessel is placed below the funnel. Water is stored in a tank above the bottle. The water is heated. When the water reaches a predetermined temperature, a valve is opened, causing the heated water to drain from the tank into the bottle, by force of gravity and without the aid of a pump. Also, the lid of the pod is opened, causing the entire contents of powdered formula to fall, under the influence of gravity and without other mechanical aid, into the funnel, which directs the powdered formula into the bottle, where the powdered formula and heated water may be mixed by an operator.

Certain embodiments are directed to a method for preparing baby formula. The method includes containing an amount of powdered formula premeasured for yielding a single serving of baby formula and containing a volume of water at least as great as an amount of water for yielding a single serving of baby formula. The method further includes heating the water, dispensing substantially all of the premeasured amount of powdered formula into a vessel, and dispensing the amount of water for yielding the single serving of baby formula into the vessel in response to the water reaching a predetermined temperature, thereby delivering into the vessel powdered formula and heated water for constituting a single serving of baby formula.

Other embodiments are directed to an apparatus for preparing baby formula. The apparatus includes a first container for containing an amount of powdered formula premeasured to yield a single serving of baby formula, a second container for containing a volume of water premeasured to yield a single serving of baby formula, and a heater within the second container. The apparatus further includes a first actuator configured to dispense substantially the entire contents of the first container into a vessel and a second actuator configured to dispense substantially the entire contents of the second container into the vessel in response to the heater heating the water to a predetermined temperature. The apparatus is thereby configured to deliver into the vessel powdered formula and heated water for constituting a single serving of baby formula.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention. In the accompanying drawings.

DETAILED DESCRIPTION OF THE INVENTION

Figure 1:
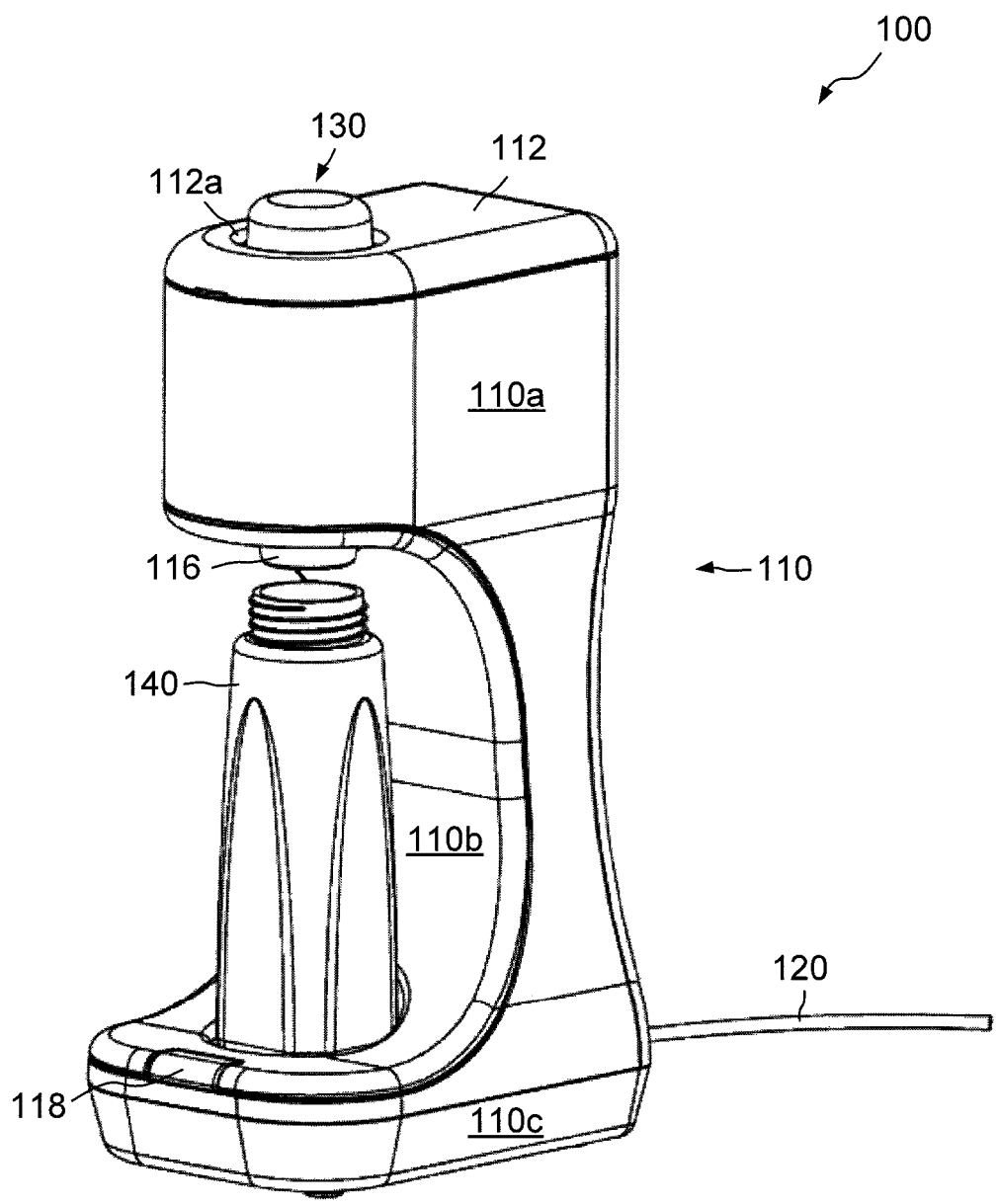
FIG. 1 is a front perspective view of a machine for preparing formula.

Embodiments of the invention will now be described. It is understood that such embodiments are provided by way of example to illustrate various features and principles of the invention, and that the invention hereof is broader than the specific example embodiments disclosed.

An improved technique for preparing baby formula includes containing an amount of powdered formula, premeasured to provide a single serving of baby formula, containing an amount of water, premeasured to provide at least a single serving of baby formula, heating the water, and dispensing both the premeasured formula and the water for providing a single serving into a bottle or other vessel when the water reaches a predetermined temperature.

FIGS. 1-8 show different views of an example apparatus 100 for preparing baby formula. The apparatus 100 includes a body 110, which is made of different body portions 110a-110d that preferably snap together. A cover 112 is provided at the top of the apparatus 100 and opens and closes on a hinge 210 (see FIG. 2). A removable pod 130 is placed in an inverted orientation in the apparatus 100, with a bottom of the pod 130 extending through an opening 112a in the cover 112. The apparatus 100 includes a line cord 120, which may be plugged into an electrical outlet for receiving electrical power, and a single button 118. A vessel, such as a bottle 140 may be situated on a base holder 732 (see FIG. 7), and a funnel 116 can be seen extending down from above the bottle 140 for guiding powder and/or water into the bottle 140.

Figure 2:
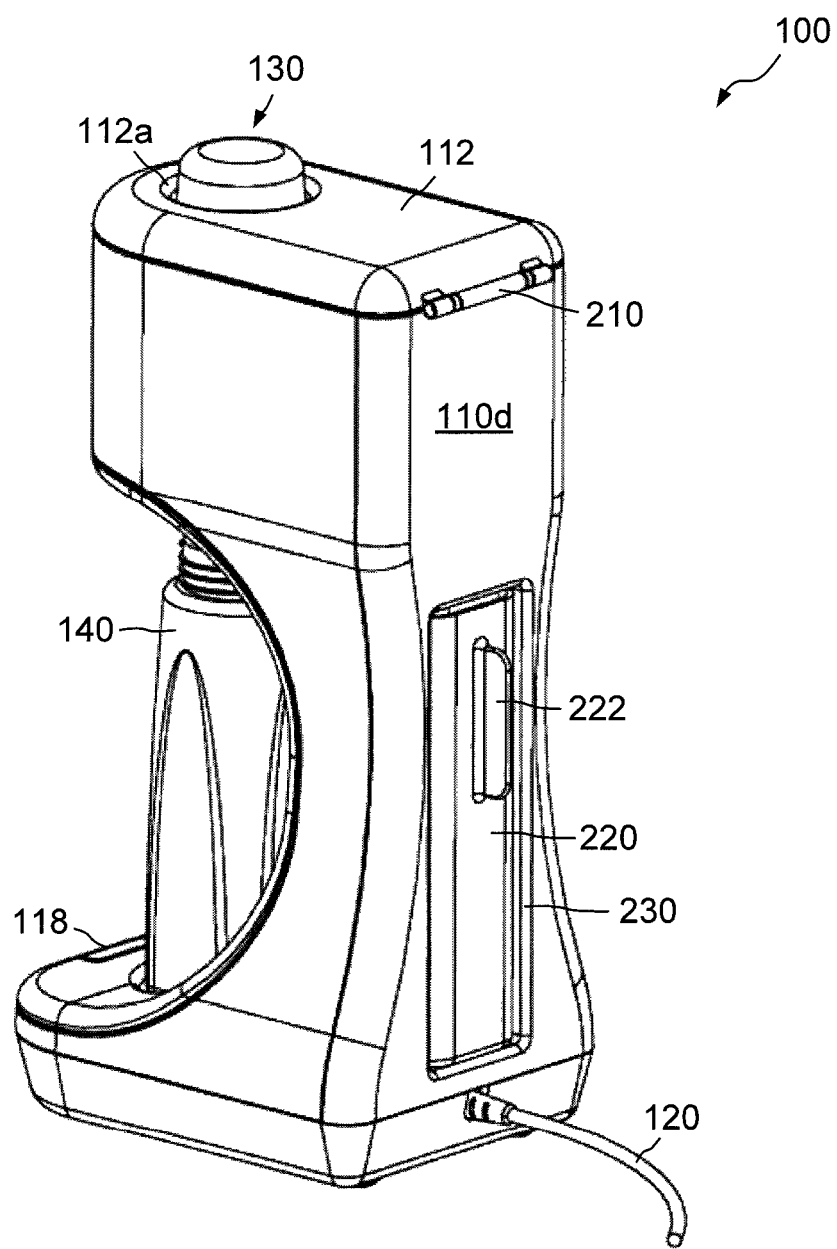
FIG. 2 is a rear perspective view of the machine of FIG. 1.
Figure 3:
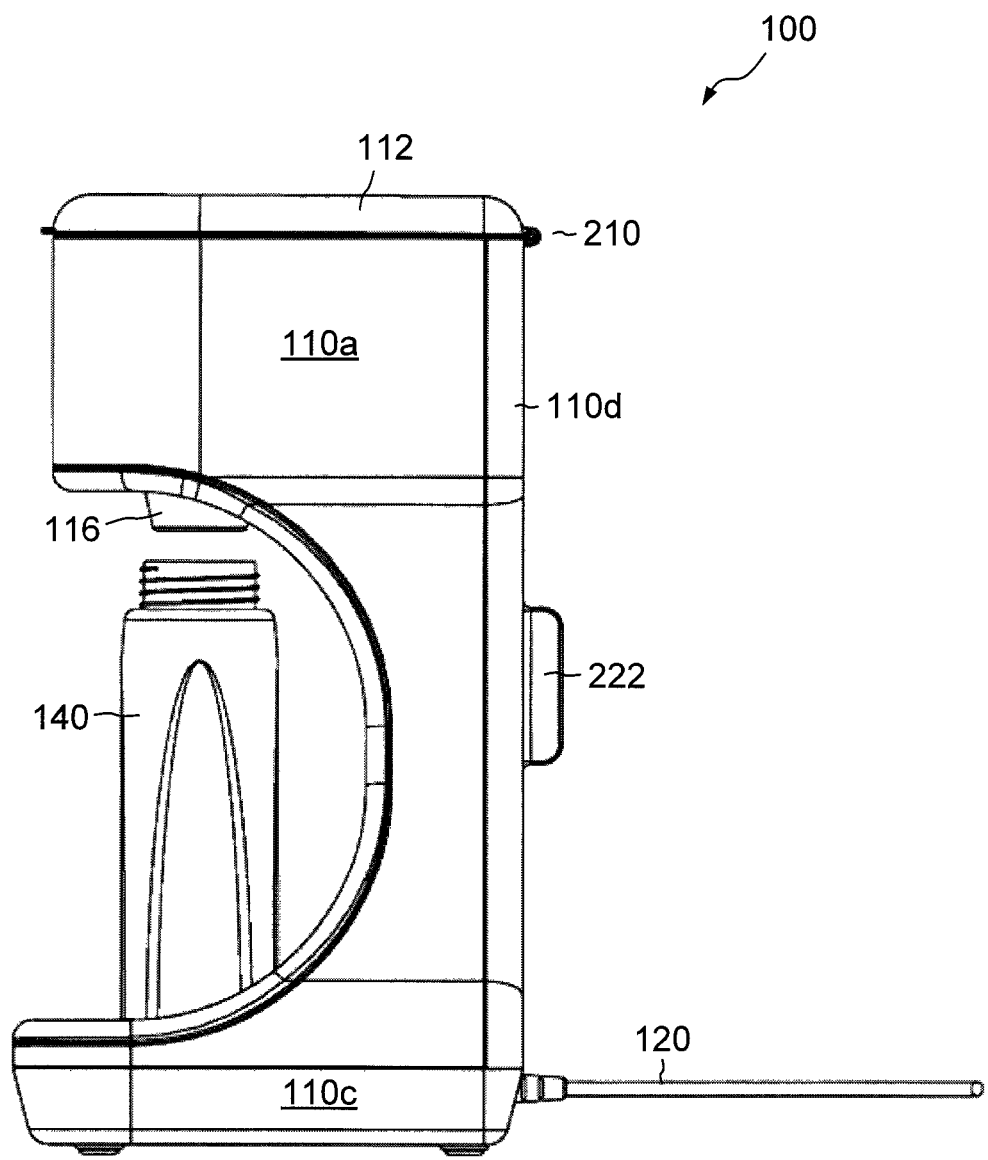
FIG. 3 is side, elevation view of the machine of FIG. 1.
Figure 6:
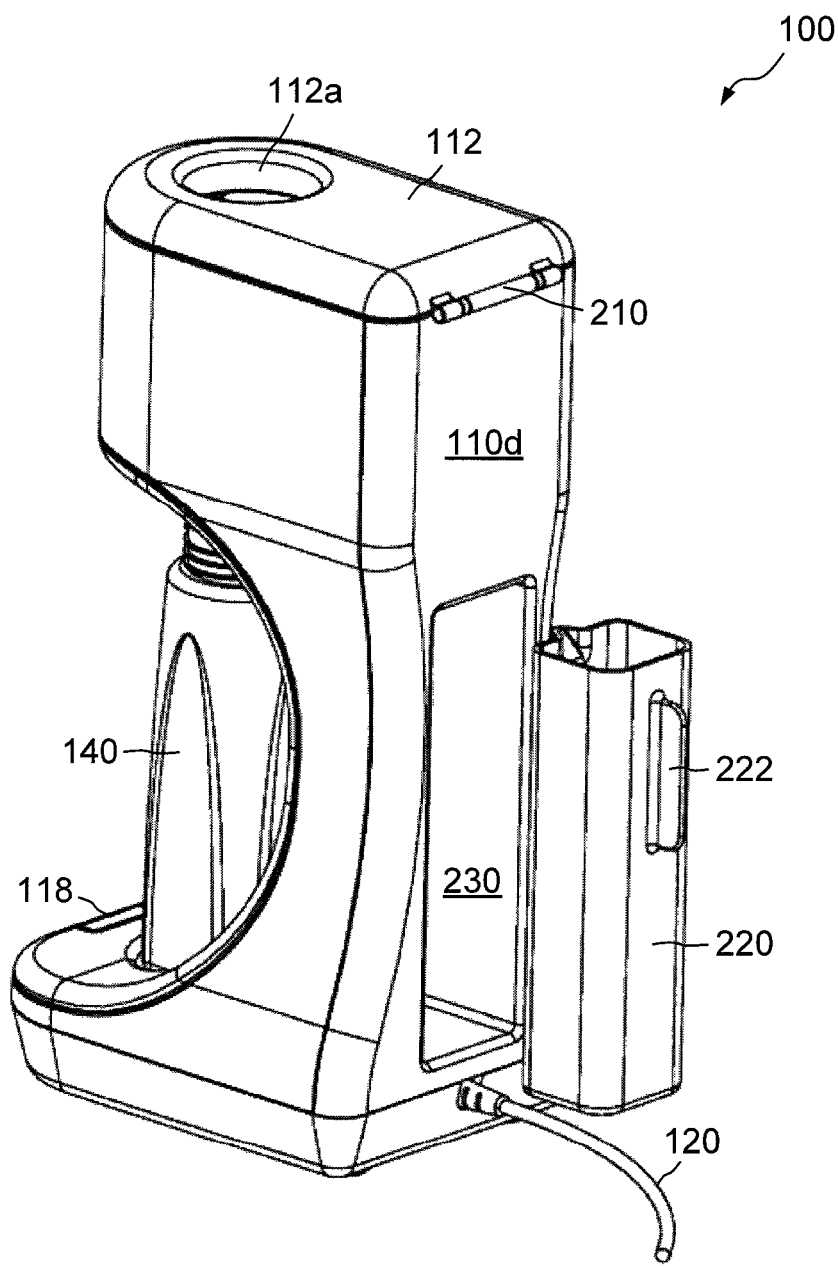
FIG. 6 is rear perspective view of the machine of FIG. 1, showing a measuring cup removed from its nest within the machine.

As best seen in FIGS. 2 and 6, a rear of the apparatus 100 includes a receptacle area, or "nest" 230, for receiving a removable measuring cup 220. The measuring cup 220 preferably snaps into place within the nest 230 and is lightly retained therein for convenient storage. The measuring cup 220 has a finger grip 222 and preferably includes one ore more markings (not shown), which indicate a water level within the measuring cup 220 for a single serving of baby formula. The measuring cup 220 may also (or alternatively) include conventional volume markings, such as markings for cups and/or liters.

Figure 4:
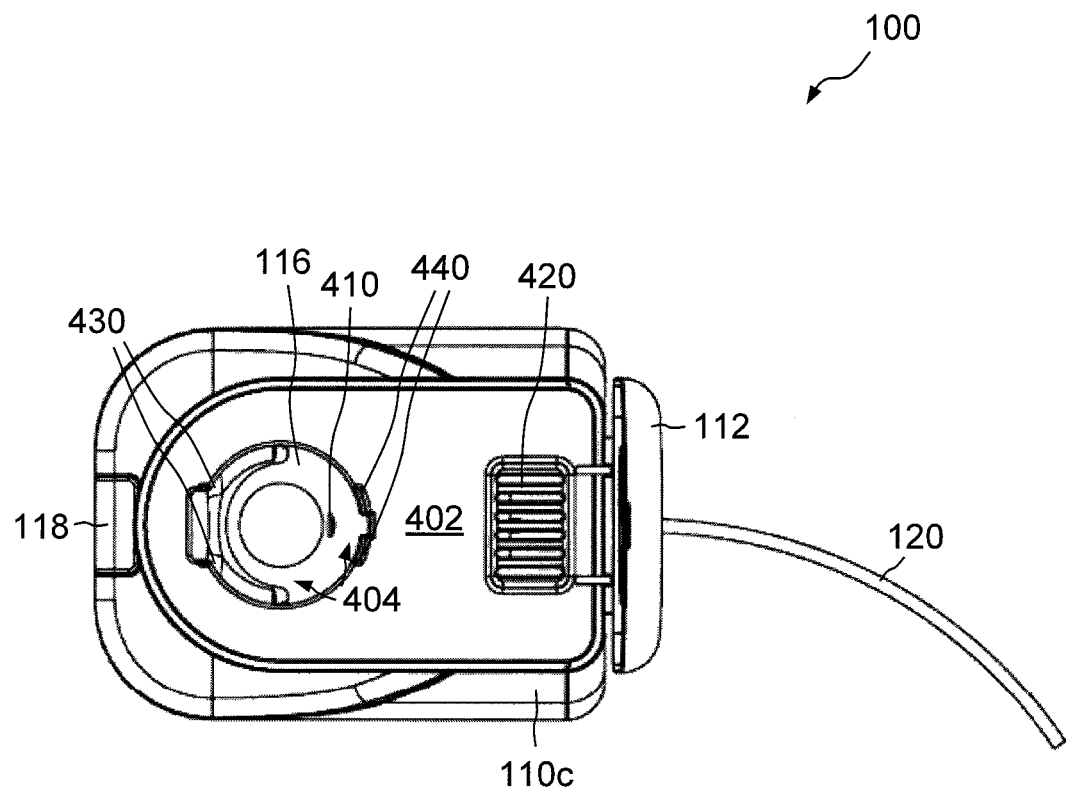
FIG. 4 is a top view of the machine of FIG. 1.

FIG. 4 shows the top of the apparatus 100 with the cover 112 in an open position and the pod 130 removed. Here, a pod tray 402 can be seen to include the funnel 116 and a water inlet 420. In this example, a spout 410 is disposed in a side of the funnel 116 for releasing heated water into the bottle 140. The pod tray 402 includes a pod receiving area 404 for holding a pod 130 in an inverted orientation. The pod receiving area 404 includes front shoulders 430 and back shoulders 440. The shoulders 430 and 440 are positioned and arranged to hold the pod 130 in a stable, inverted arrangement while allowing the lid of the pod to open freely for discharging powdered formula.

Figure 5:
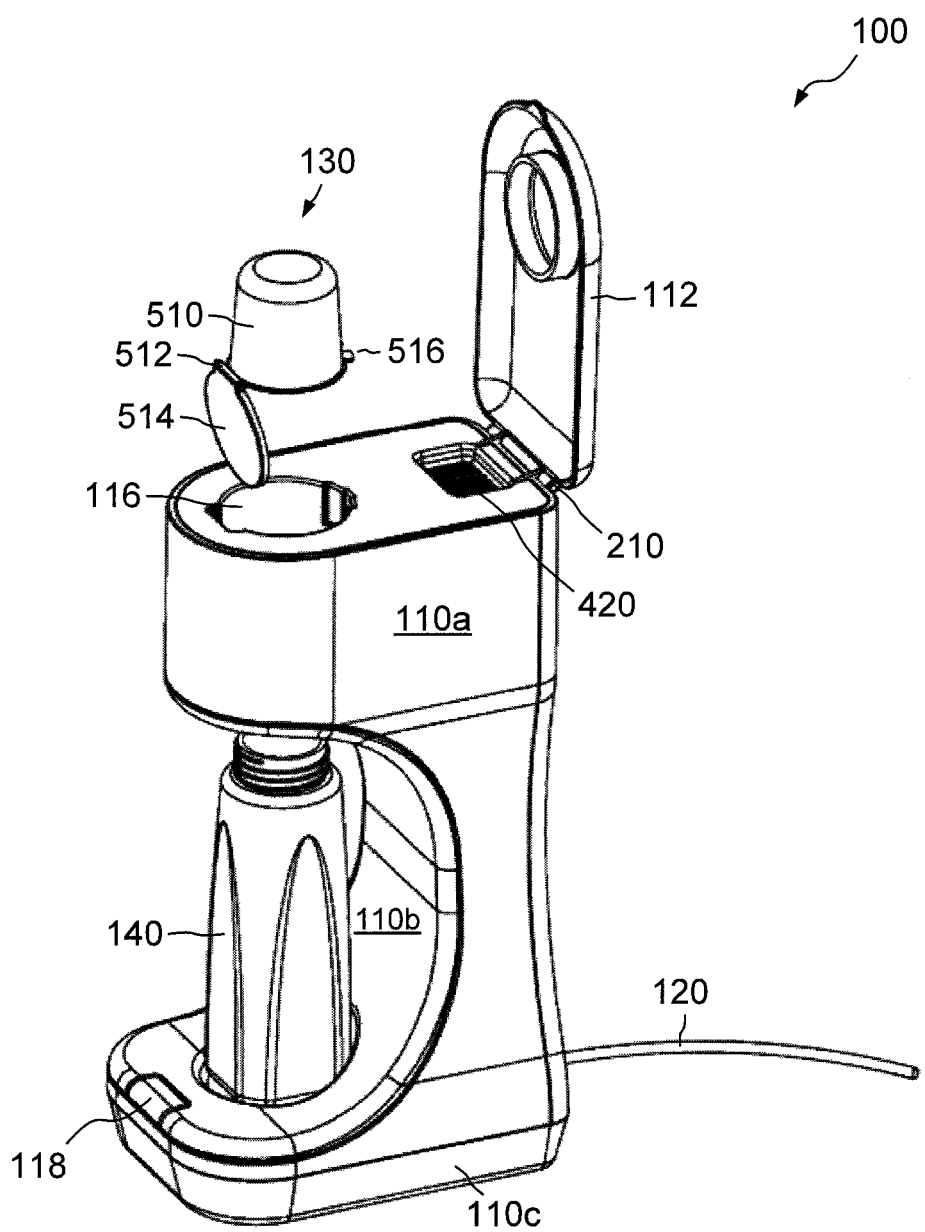
FIG. 5 is a side, perspective view of the machine of FIG. 1, with an opened cover and showing an opened, un-inserted pod.

As seen in FIG. 5, the pod 130 includes a cup 510, a hinge 512, a lid 514, and front tabs 516. For illustration, the pod 130 is shown above the funnel 116; however, it is understood that the pod 130 may assume the configuration shown (with the lid 514 opened down and the tabs 516 facing back) when the pod 130 is placed in the pod receiving area 404 in the apparatus 100. With the pod 130 placed in the pod receiving area 404, the tabs 516 rest against the back shoulders 440. Also, protrusions 512a and 512b (see FIGS. 9-12) rest against the front shoulders 430.

Figure 7:
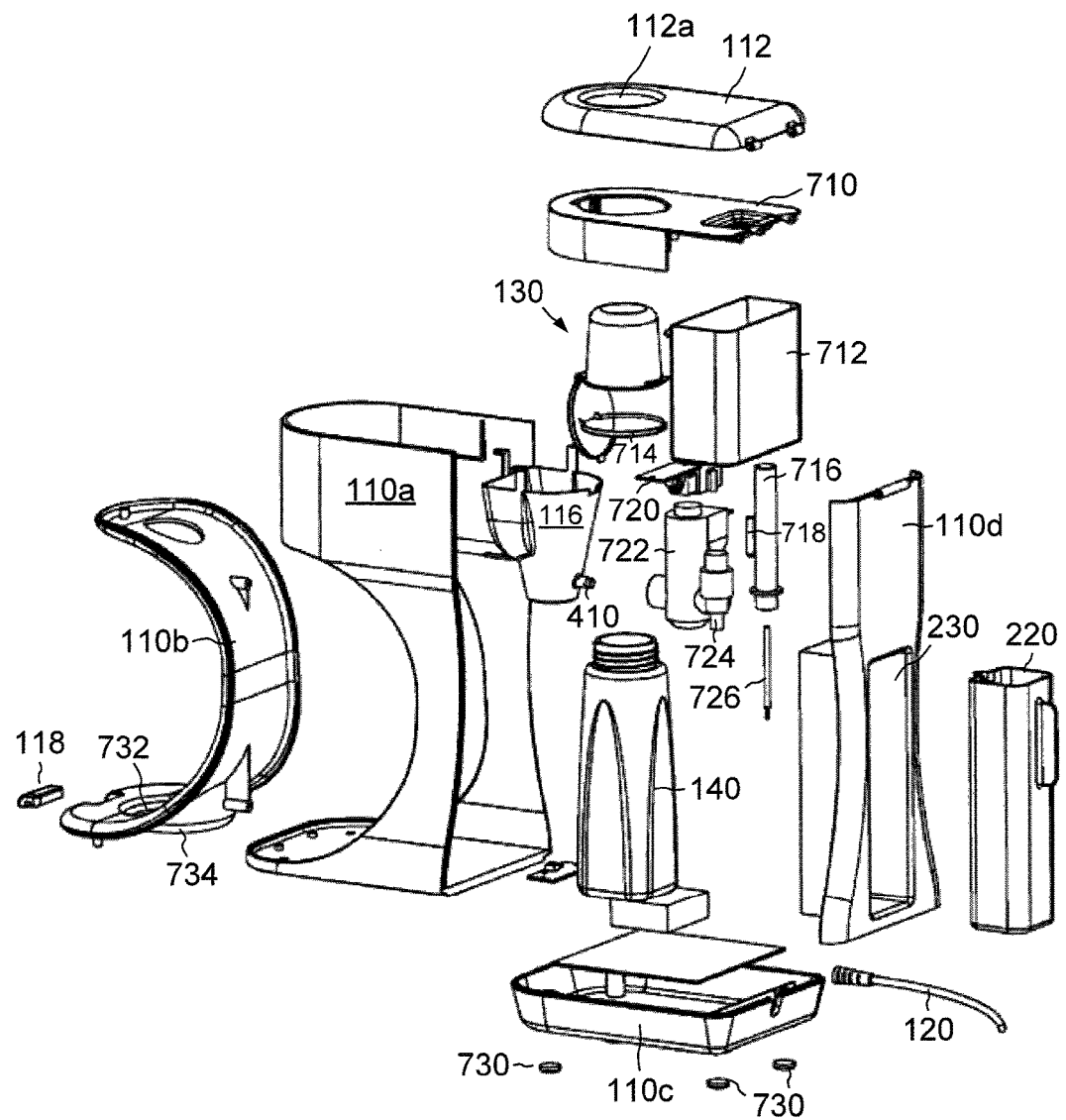
FIG. 7 is an exploded view of various portions and components of the machine of FIG. 1.
Figure 8:
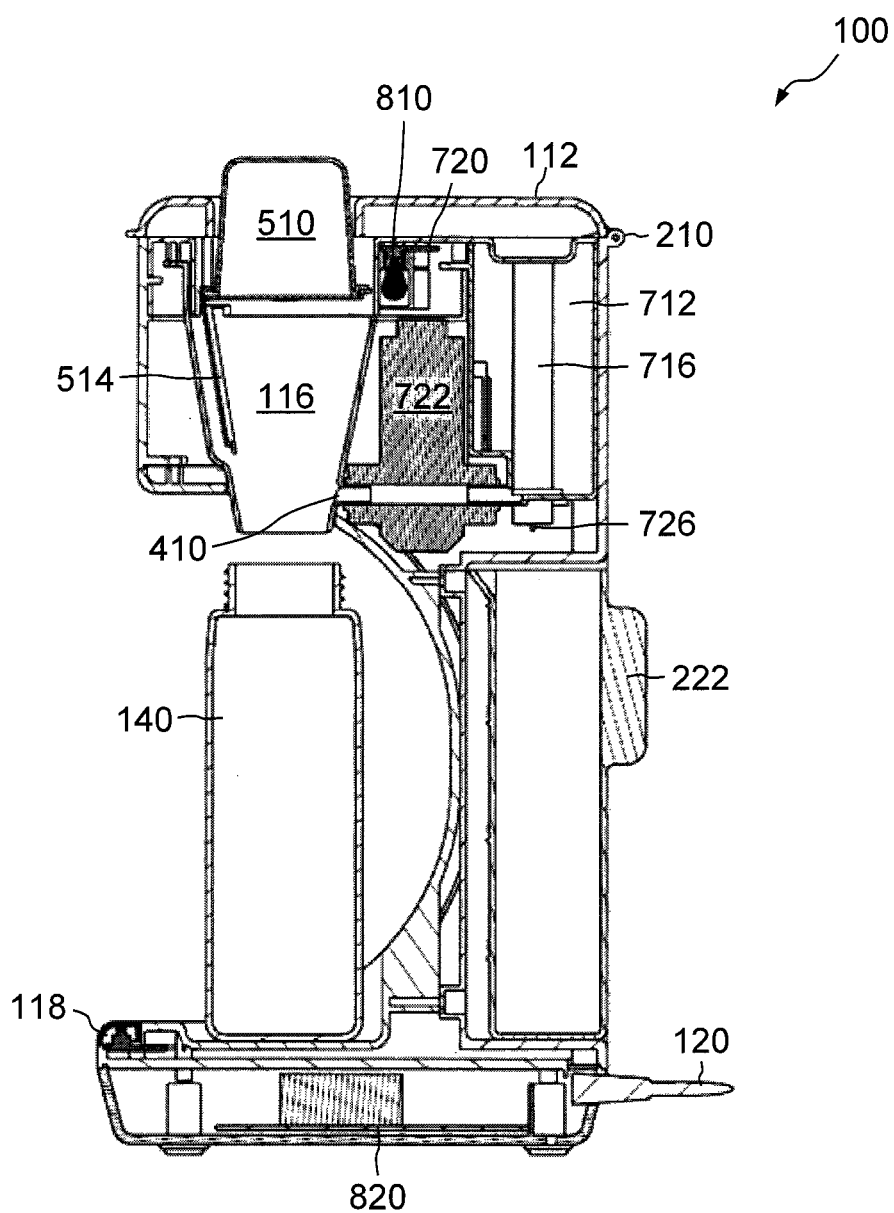
FIG. 8 is a cross-sectional view of the machine of FIG. 1.
Figure 9:
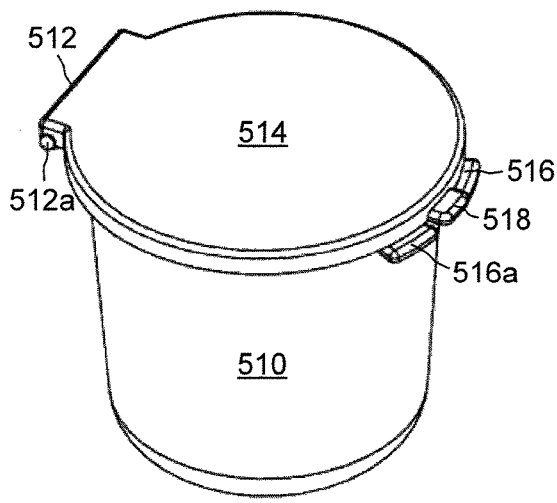
FIGS. 9-12 are various perspective views of a pod used in the machine of FIG. 1.
Figure 10:
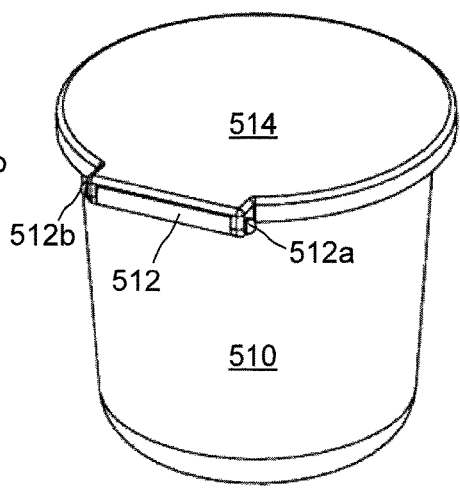

FIG. 7 shows an exploded view of the apparatus 100, and FIG. 8 shows a cross-sectional view. Here, a water tank 712 is shown within the apparatus 100 for receiving water to be heated. A level sensor 716, typically provided within the water tank 712, measures the water level within the tank 712. Also, a heating element 726 and a temperature sensor 718 (e.g., a thermocouple) are disposed within the water tank 712, respectively to heat the water and to measure the water's temperature. A valve 722 is connected to the spout 410 on one end, and to the water tank 712 on the other end. A motor 724 (e.g., a DC motor) operates to open and close the valve 722. Opening the valve 722 allows water to flow from the water tank 712 to the spout 410 and thus into the bottle 140. Closing the valve 722 prevents water from flowing to the spout 410. Another motor 720 (e.g., a DC motor) is coupled to a cam 810 positioned near the pod receiving area 404. When the motor 720 is activated, the motor 720 rotates the cam 810 to push open the lid 514 of the pod 130. For example, a tip of the cam 810 is rotated downwardly to contact a tab 518 extending from the lid 514—see FIG. 9—and thus to pop open the lid 514. The apparatus 100 may also include slip-resistant feet 730 (e.g., made of rubber or some other flexible material) attached to a base of the unit. A base holder 732 provides a location for holding the bottle 140. In some examples, the base holder 732 includes a bottle sensor 734 (e.g., a load cell, optical sensor, etc.) for detecting the presence of a bottle on the base holder 732. In addition, a compliant sealing ring 714 may be provided on a lip of the cup 510 to provide a more secure seal. In an example, the sealing ring 714 is composed of an elastomeric material, such as rubber, neoprene, or some other flexible material.

As seen in FIG. 8, the apparatus 100 also includes a controller 820. The controller 820 may be realized in the form of one or more printed circuit boards on which various electronic components are provided. The controller 820 is electrically coupled, e.g., via cables and connectors, to the button 118, to the actuators 720 and 724, to the heating element 726, and to the various sensors 716, 718, and 734.

Figure 11:
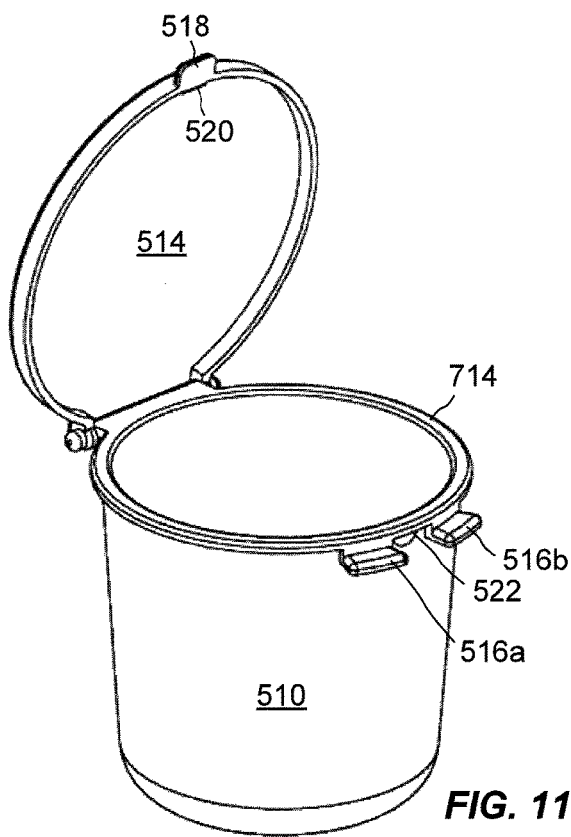
Figure 12:
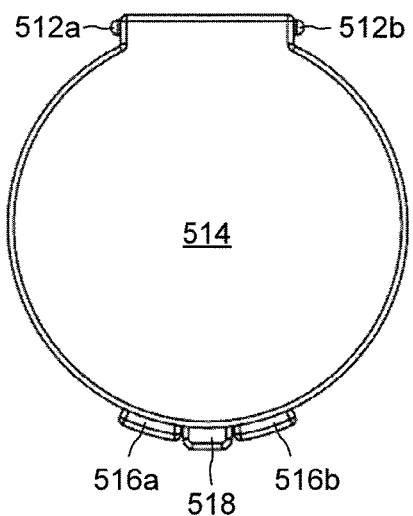

FIGS. 9-12 show different views of an example pod 130. As described above, the pod 130 may include a sealing ring 714 applied to the lip of the cup 510. In an example, the sealing ring 714 includes a channel on the underside thereof for engaging the lip of the cup 510 and maintaining an attachment to the lip via friction. As shown in FIG. 11, the tabs 516, shown more particularly as tabs 516a and 516b, extend from and are integral with the sealing ring 714. The sealing ring has a latching lip 522, and the pod lid 514 has a latching tab 520. When the operator closes the lid 514, the latching tab 520 snaps lightly over the latching lip 522. The closure of the latching tab 520 with the latching lip 522 is preferably strong enough to resist opening when the pod 130 is filled with powdered formula, inverted, and lightly shaken, yet not so strong that it cannot be easily opened when the pod 130 is inserted in the apparatus 100 and the cam 810 is made to strike the tab 518.

In some examples, the hinge 512 of the pod 130 is a "living hinge," i.e., a thin flexible hinge made from the same material as the cup 510 and the lid 514. Providing the hinge 512 as a living hinge allows the cup 510, lid 514, and hinge 512 to be manufactured as a single component from a single material, such as plastic, paper, cardboard, or some other material, for example. Suitable plastics include polyethylene and polypropylene, for example. The inside of the cup 510 is preferably smooth and may have a high polish, mirror surface. The smooth surface allows powdered formula to drop from the pod 130 when the lid 514 is opened without the powder adhering substantially to the inside of the cup 510. The inside of the funnel 116, which also makes contact with powdered formula, preferably has a similar or the same finish and is made of a similar or the same material.

The pod 130 may include a number of features to promote operator convenience. For example, the pod 130 may include one or more markings (not shown) for identifying volume levels. One marking may be placed so that filling the cup 510 with powder to the level of the marking provides the amount of powder for making a single serving of formula. Other markings may be provided, such as markings for English units (e.g., cups, tablespoons, etc.) and/or markings for metric units (liters, milliliters, etc.).

Also, the pod 130 may include one or more transparent regions, for allowing operators to visualize any powder contained within the pod 130. In one example, the cup 510 and/or the lid 514 are made of a transparent material. In another example, the cup 510 and/or the lid 514 are primarily opaque but include a transparent window. Windows can be provided anywhere on the pod 130, but are particularly useful to operators when included on the bottom of the cup 510 (which faces up in normal operation) or on a side of the cup 510, which can be seen through the opening 112a in the hinged cover 112. In one particular example, the cup 510 includes a transparent strip that runs down the side of the cup 510, from the bottom of the cup 510 to the lip.

The particular geometry of the pod 130 can be varied to accommodate different machines and/or user preferences. For example, the pod 130 can be made taller and narrower or shorter and wider. It can have more rounded features or more angular features than those shown. The pod 130 is not required to have a round top. Rather, a wide variety of shapes are contemplated.

In some examples, pods 130 are designed to be used and reused hundreds or more times and thus to provide a long service life. In other examples, pods 130 are provided as single-use items. A removable cover may be applied to the cup 510 to seal in a factory-dispensed amount of formula. The operator opens the lid 514 and peels off the cover. The operator then closes the lid 514 and places the pod 130 in the apparatus 100, which then operates in the usual way.

Many variations in pod design are contemplated. In one example, the pod 130 uses a magnetic closure, rather than a snap, to hold the lid closed. In another example, the pod lid 514 is closed using an interference ball/cup interface. In some examples, the hinge 512 is formed by two components that snap together. In some examples, the pod lid 514 is threaded to the cup 510 and rotated (e.g., by ¼-turn) to open the lid 514. As a variant on this idea, the operator may be required to insert the pod 130 into the pod receiving area 404 and rotate the pod 130 ¼-turn to fully engage the pod 130. In some examples, the pod 130 includes magnetic material (e.g., steel or magnets) and is attracted magnetically to the pod receiving region 404, which also includes magnetic material. The resulting magnetic attraction between the pod 130 and the pod receiving area 404 helps to guide the pod 130 into place within the pod receiving area 404. According to one variant, the pod receiving area 404 includes a ring of lights (e.g., an LED-illuminated ring or light pipe), which illuminate the pod receiving area 404 and helps the operator to guide the pod 130 into place, even in the dark.

In some examples, separate, single-use inserts are provided for the pods 130. The inserts fit within the pods 130 and provide single servings of formula. The inserts may be supplied in the form of lightweight cups with removable film covers (e.g., similar to coffee creamer containers found in restaurants). An operator may peel off the lid of an insert and place the insert in an opened pod 130. The operator may then close the lid 514 and place the loaded pod 130 in the apparatus 100 in the usual way. In some examples, the inserts are made to match the interior of the cup 510. Each insert has a lip that includes tab regions that fit over the tabs 516 and/or projections 512a, thereby allowing the tab regions to rest on the shoulders 430/440 in the pod receiving area 404. The shoulders 430/440 prevent the insert from falling into the funnel 116 when the apparatus opens the lid 514 of the pod 130.

Figure 13:
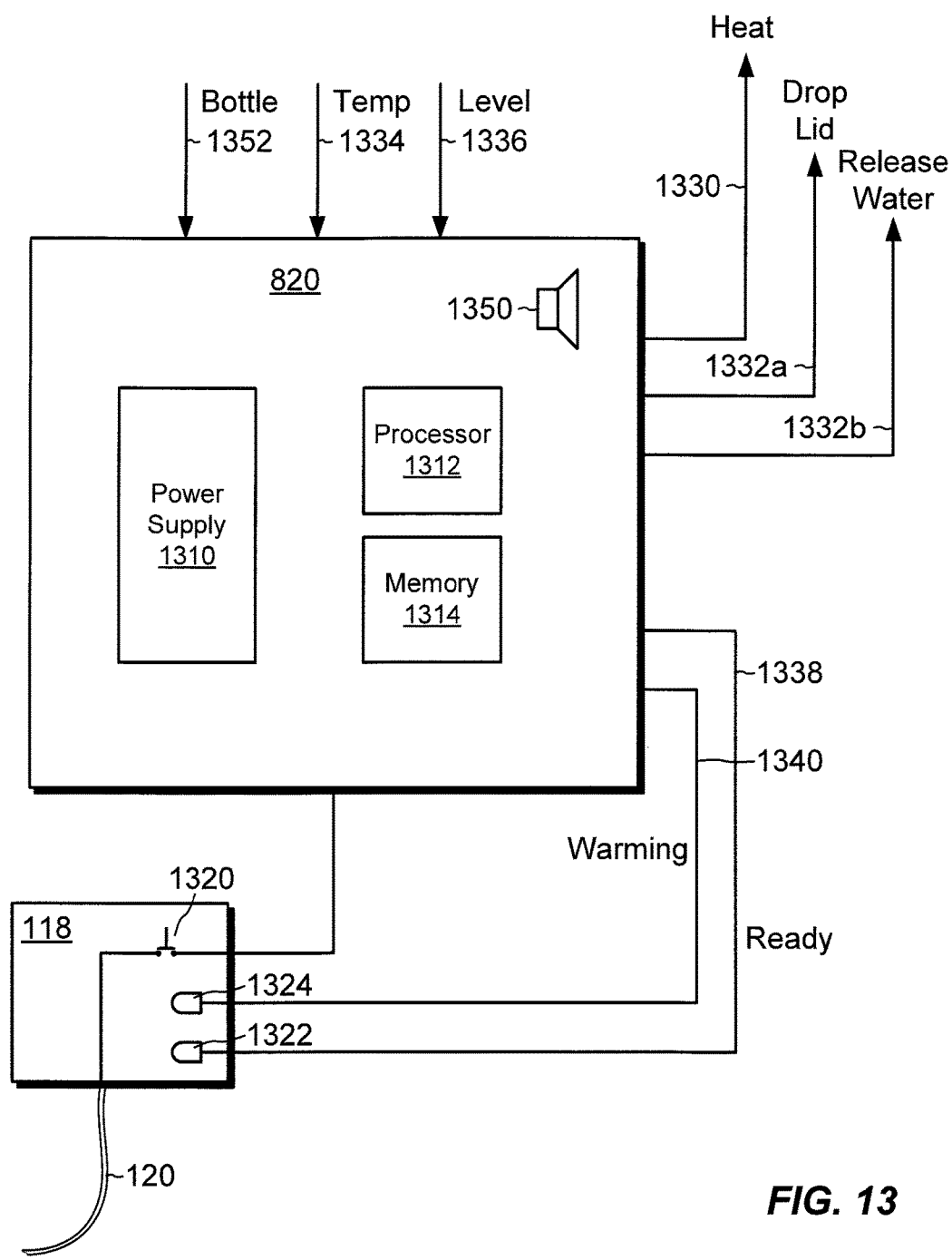
FIG. 13 is a block diagram of a controller and power switch of the machine of FIG. 1.

FIG. 13 shows an example arrangement of the controller 820 and of the button 118. Here, the button 118 is seen to include a contact switch 1320 connected to the line cord 120, for receiving, for example, 120 VAC or some other available line voltage. The button 118 is also seen to include a red LED (light emitting diode) 1324 and a green LED 1322. The controller 820 also includes a power supply 1310 (e.g., and "off-the-line" switching power supply), a processor 1312 (e.g., a low-power microprocessor or microcontroller), memory 1314, and a speaker 1350. The memory 1314 includes both volatile and nonvolatile memory and may alternatively be included within the processor 1312. The controller 820 is constructed and arranged to carry out the various automatic processes described herein.

The controller 820 receives signals from the various sensors, such as a bottle signal 1352 from the bottle sensor 734, a temperature signal 1334 from the temperature sensor 718, and a level signal 1336 from the level sensor 716. The signals 1352, 1334, and 1336 are conveyed to the controller 820 by wires and/or cables, for example.

The controller 820 also generates control signals, such as a heat signal 1330, for directing the heating element 726 to turn on and off, a drop lid signal 1332a, for directing the motor 720 to rotate the cam 810 for opening the pod 130, and a release water signal 1332b, for directing motor 724 to open and close the valve 722. The controller 820 also generates signals for 1338 and 1340 for turning on and off the LEDs 1322 and 1324, respectively. These signals are preferably conveyed using wires or cables, as well.

Example operation of the apparatus 100 will now be described. Operators may use the apparatus 100 to prepare single servings of baby formula one serving at a time. An operator adds powdered formula to an empty pod 130 for making a single serving of formula. The operator closes the lid 514 of the pod 130, opens the cover 112, and places the pod 130 in an inverted position within the pod receiving area 404. The pod is placed with the hinge 512 facing the front of the apparatus 100, such that the tabs 516 rest on the back shoulders 440 and the protrusions 512a/512b rest on the front shoulders 430. The operator then uses the measuring cup 220 to measure an amount of water needed to make a single serving of formula and pours the water into the water tank 712 via the water inlet 420. The operator then closes the cover 112 and pushes the button 118.

The controller 820 detects the pressing of the button 118 and initiates a preparation sequence. For example, the controller 820 receives power when the switch 1320 closes and starts the preparation sequence as soon as it assumes an operational state. The controller 820 asserts the warming signal 1340 to illuminate the red LED 1324 within the button 118 and may direct the speaker 1350 to issue a single beep. The controller 820 asserts the heat signal 1330 to activate the heating element 726 to heat the water in the tank 712. The temperature sensor 718 measures the water temperature, and the controller 820 monitors the measured temperature via the signal 1334. When the water temperature reaches a predetermined level, such as 98.6 degrees Fahrenheit, or thereabouts, the controller 820 de-asserts the heat signal 1330 to turn off the heating element 726 and asserts the release water signal 1332b to direct the motor 724 to open the valve 722, thereby allowing the heated water to drain into the bottle 140. The controller 820 also asserts the drop lid signal 1332a to activate the motor 720 to rotate the cam 810 (e.g., by a full rotation) to pop open the lid 514 of the pod 130. The lid 514 swings down and open, and the powdered formula contained within the pod 130 falls through the funnel 116 and into the bottle 140. The controller 820 may then monitor the level signal 1336 to detect when all water has been emptied from the water tank 712, or the controller 820 may simply wait a predetermined number of seconds (e.g., 5 seconds). Then the controller 820 directs the motor 724 to close the valve 722 and ready the apparatus 100 for receiving more water later (preferably, the valve 722 closes when no power is applied). The controller 820 then issues the ready signal 1338 to illuminate the green LED 1322 and may issue a pair of beeps via the speaker 1350, to indicate that the preparation sequence is complete.

The preparation sequence described above is provided by way of example, and the sequence of steps can be varied. Some steps may be performed simultaneously. For example, it is irrelevant whether the operator inserts the pod 130 before or after adding the water. Also, the controller 820 can dispense water before or after releasing powder. According to one variant, the heated water continues to be dispensed into the bottle 140 after the powdered formula has been released into the bottle 140. Maintaining a flow of water after the release of powdered formula ensures that the water clears the drain spout 410 of any powder that may splash back as a result of dispensing the powdered formula. In some variants, once the water reaches the predetermined temperature, powder is dispensed into the bottle 140 before the heated water is dispensed. In other variants, e.g., where there is a low likelihood that powder will adhere to the drain spout, water is completely dispensed before powder is dispensed. Displacing the dispensing of water and powder in time discourages any interaction between water and powder within the apparatus 100, and thus helps the keep the apparatus 100 clean.

The preparation sequence may include various failsafe mechanisms. For example, prior to directing the heating element 726 to heat the water, the controller 820 may first check the level sensor 716 to ensure that water is present in the water tank 712. If the level sensor 716 indicates an absence of water, the controller 820 aborts the preparation sequence. One or both LEDs 1322 and 1324 may be made to flash and/or beeps may be sounded to indicate the error condition. Also, the controller 820 may check the bottle sensor 734 for the presence of a bottle 140. If no bottle is detected, the preparation sequence may be aborted in a similar manner.

In some examples, the apparatus 100 is configured to receive more water in the water tank 712 than is required for constituting a single serving of formula. In these instances, the apparatus 100 may include a water metering device (not shown). The controller 820 monitors the metering device during the preparation sequence and directs the motor 724 to close the valve 722 when the apparatus 100 has dispensed an amount of water for constituting a single serving. In a variant of this example, the operator may establish, e.g., via an input device such as a set of switches (not shown), the amount of water for constituting a single serving.

Although the apparatus 100 may be configured to accept more water than is needed for one serving, a preferred implementation excludes any metering equipment and simply dispenses all water in the tank 712 during the preparation sequence. Dispensing all water in the tank 712 (and all powder in the pod 130) simplifies the design of the apparatus 100 as well as its use by operators. Indeed, an advantageous design feature of the apparatus 100 is its ability to dispense powder and water with little electronic or mechanical assistance. The mere rotation of the cam 810 causes all powder to be dispensed, and the mere opening of the valve 722 causes all water to be dispensed. Because the pod 130 is situated above the bottle 140, powder falls through the funnel 116 and into the bottle 140 by force of gravity and with no other required assistance (e.g. no auger, lifter, etc.). Similarly, because the water tank 712 is situated above the spout 410, water flows out of the tank 712, through the spout 410 and into the bottle 140 by force of gravity and with no other required assistance (e.g., no pump or other inducer).

An improved technique has been shown and described for preparing baby formula. The includes containing an amount of powdered formula, premeasured to provide a single serving of baby formula, containing an amount of water, premeasured to provide at least a single serving of baby formula, heating the water, and dispensing both the premeasured formula and the water for providing a single serving into a bottle or other vessel when the water reaches a predetermined temperature.

Having described certain embodiments, numerous alternative embodiments or variations can be made. For example, although FIG. 13 shows a processor 1312 and memory 1314, simpler implementations may be provided, which do not require advanced electronics. For example, circuitry can be provided to power the heating element 726 when the button 118 is pressed. The temperature sensor 718 can be provided as a thermostat, and the circuitry can respond to the thermostat reaching a pre-set temperature by automatically powering the actuator 720 for rotating the cam 810, and automatically actuating the valve 722 to dispense the heated water.

Also, although it has been described that powder is released by action of the motor 720 and cam 810, it is understood that other actuators may be used. Similarly, although it is described that water is released by action of the motor 724 and the valve 722, other actuators may be used for this purpose, as well. For example, the valve 722 may include a solenoid or electro-static mechanism and may thus be operated without a motor.

Figure 14:
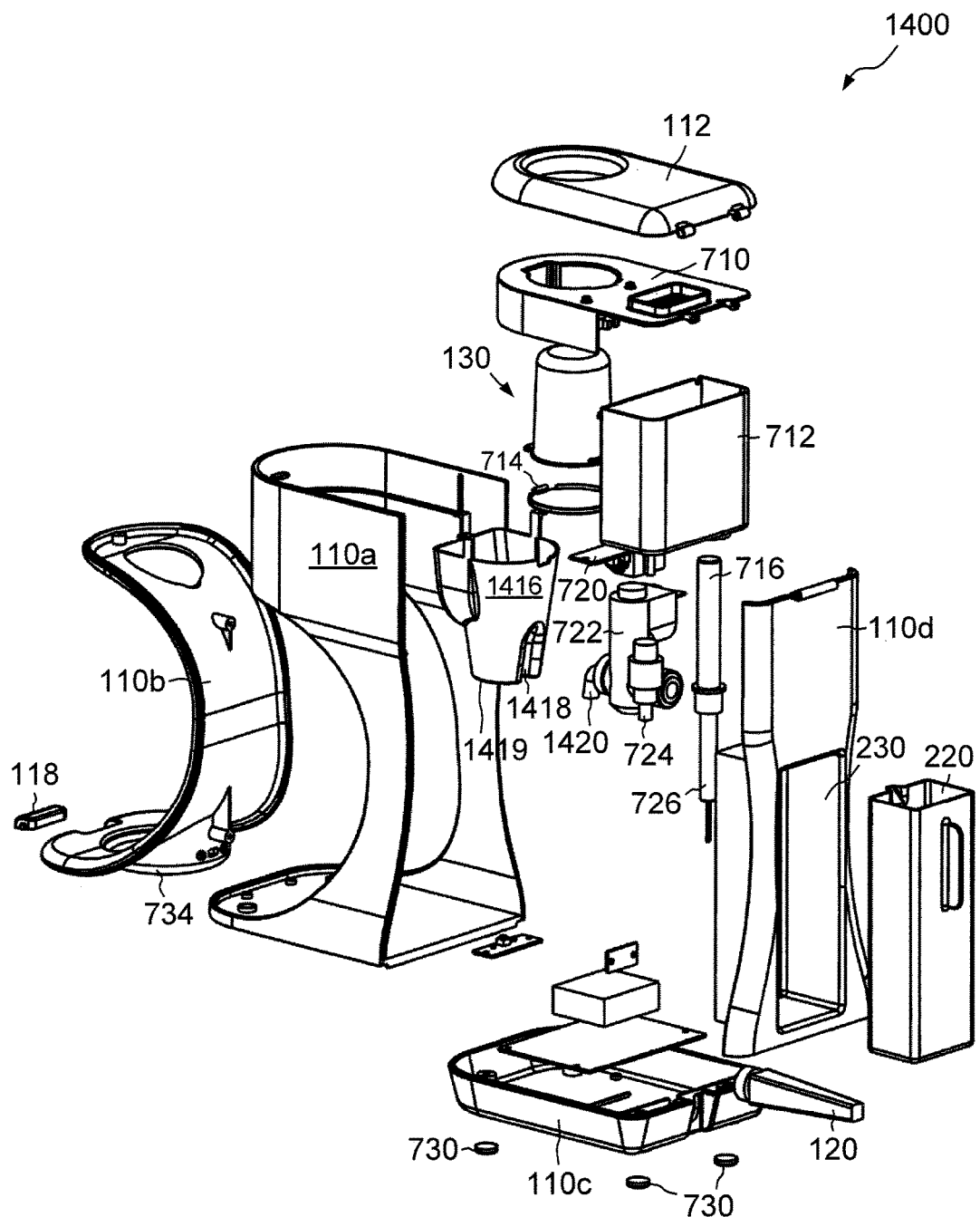
FIG. 14 is a an exploded view of various portions and components of the machine of an alternative implementation of the apparatus of FIG. 1.
Figure 15:
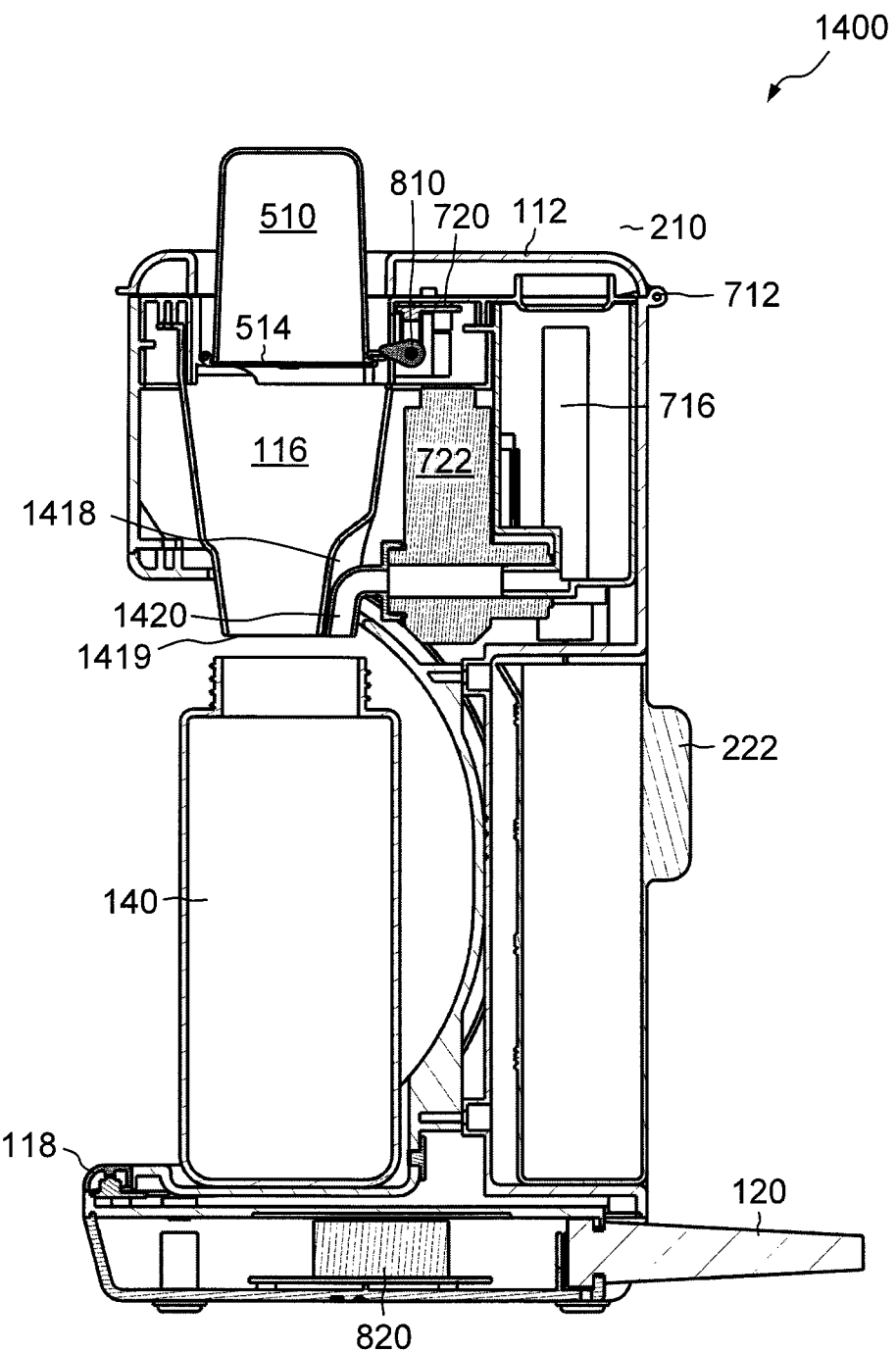
FIG. 15 is a cross-sectional view of the alternative implementation of the apparatus of FIG. 1.

Also, FIGS. 14 and 15 show an alternative apparatus 1400 in which a modified funnel 1416 and spout 1420 provide physically separate paths for dispensing powder and water. In an example, the funnel 1416 has a generally round bottom 1419 (when viewed end-on from the underneath) with a circumference that is approximately the same as, or slightly smaller than, the circumference of the top of the bottle 140. In some examples, the round bottom 1419 is generally circular; in other examples, it is generally oval or has some other curved shape. The bottom of the funnel may also take the shape of a polygon or other closed figure. A recessed region 1418 is provided at the bottom 1419 of the funnel 1416, within the bottom circumference (or perimeter) of the funnel 1416, to provide space for the drain spout 1420. The drain spout 1420 fits within the recessed region 1418 within the bottom circumference/perimeter of the funnel 1416. Separate dispensing paths for powdered formula and water are thus contained within the bottom circumference of the funnel 1416, to allow powdered formula and water to be dispensed side-by-side into the bottle 140, without direct interference with each other. Maintaining separate dispensing paths in this manner prevents contact between powdered formula and water within the apparatus 1400 and thus prevents powdered formula from moistening and adhering to the apparatus 1400 in the vicinity of the drain spout 1420.

Also, although the apparatus 100/1400 has been shown and described for use with baby formula, it can also be used for other beverages, such as instant coffee, hot chocolate, sports drinks, medications, nutritional supplements and so forth. In some implementations, powdered material in the pod 130 may be replaced with syrup, liquid, granules, grains, or other materials. In some examples, water may be heated with an in-line or other heating element outside the water tank 712. Any such in-line heater may include an internal temperature sensor to emit heated water at the desired temperature.

In addition, it has been recognized that the opening 112a in the cover 112 of the apparatus 100/1400 may allow dust or other foreign matter to enter the apparatus 100/1400. To prevent entry of such foreign matter, the cover 112 may include a sliding or rotating disc or door (e.g., on the underside of the cover 112), which may be advanced to cover the opening 112a when the apparatus 100/1400 is stored and retracted when the apparatus 100/1400 is operated. The disc or door may ride on tracks formed on the underside of the cover 112, and slide back and forth on the tracks for operation and storage.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

Table of References:

| Reference Numeral: | Description: |
| --- | --- |
| 100 | Apparatus for preparing baby formula |
| 110 | Body |

-continued

Table of References:

| Reference Numeral: | Description: |
|---|---|
| 110a | Main body portion |
| 110b | Curved body portion |
| 110c | Base body portion |
| 110d | Back body portion (110a-d preferably all snap together) |
| 112 | Cover (hinged to back body potion 110d) |
| 112a | Opening in cover 112 through which bottom of pod 130 extends. |
| 116 | Funnel (conveys both water and powdered formula into bottle 140) |
| 118 | Button/Indicator (push-button to start preparation sequence; indicator is illuminated red-via LED 1324-when water is being heated and turns green-via LED 1322-upon completion of dispensing formula and water) |
| 120 | Power cord (plugs into local power source, e.g., 120VAC line voltage) |
| 130 | Pod (holds measured amount of powdered formula, has lid 514 that drops open on hinge 512 to release powdered formula at designated time in preparation sequence; may be used repeatedly or provided as single use item, e.g., prefilled with formula). Pod may include a clear or transparent strip or section that allows the user to confirm a filled or emptied pod. |
| 140 | Bottle (receives heated water and powdered formula) |
| 210 | Hinge, for opening cover 112, to allow user to insert pod 130 |
| 220 | Measuring cup, for measuring amount of water to be mixed with formula |
| 222 | Finger grip, for facilitating handling of measuring cup 220 |
| 230 | Receptacle/nest, for storing measuring cup 220 within body 110 |
| 402 | Pod tray |
| 404 | Pod receiving area |
| 410 | Opening, where heated water enters funnel 116 to be dispensed into bottle 140 |
| 420 | Water inlet, for receiving unheated water |
| 430 | Front shoulders, for supporting pod 130 |
| 440 | Back shoulders, for supporting pod 130 |
| 510 | Pod cup, for holding measured amount of powdered formula |
| 512 | Pod hinge |
| 512a/512b | Protrusions from hinge 512, which rest against the front shoulders 430 when pod 130 is installed. |
| 514 | Pod lid (opens and closes on pod hinge 512 to dispense or retain powdered formula) |
| 516/516a,b | Tabs (contact back shoulders 440 to hold pod 130 in position when pod 130 is inserted into system 100) |
| 518 | Pod opening tab, for opening pod lid 514 when acted upon by cam 810 |
| 520 | Pod latching tab, for lightly latching pod lid 514 to pod cup 510 when pod lid 514 is closed |
| 522 | Pod latching lip, for forming a light latch with pod latching tab 520 when pod lid 514 is closed |
| 712 | Water tank |
| 714 | Compliant sealing ring (fits on pod cup 510 to help seal cup with pod lid 514); made of compliant material, such as rubber, neoprene, or elastomer |
| 716 | Level sensor, for detecting presence and/or level of water within water tank 712 |
| 718 | Temperature sensor (e.g., thermocouple), for measuring water temperature |
| 720 | Motor (actuator), for rotating cam 810 for opening pod lid 514 on pod hinge 512 at designated point in preparation sequence |
| 722 | Valve, for closing to retain water and opening to dispense heated water from water tank 712 at designated point in preparation sequence |
| 724 | Motor (actuator), for actuating valve 722 in response to control signal 1332b |
| 726 | Heating element, for heating water in water tank 712 |
| 730 | Feet (e.g., rubber), for stabilizing apparatus 100 on a surface |
| 732 | Base holder, for receiving bottle 140 |
| 734 | Bottle sensor, for detecting presence of bottle 140 or other vessel |
| 810 | Cam, for rotating to open pod lid 514 in response to actuator 720 |
| 820 | Controller, including one or more circuit boards for receiving power from line cord 120 and controlling preparation sequence of apparatus 100 |
| 1310 | Power supply, for converting line voltage to power for performing local functions (alternatively, system 100 could run on batteries, with no line cord; power supply would then be optional) |
| 1312 | Processor, such as a micro controller, microprocessor, or specialized control circuit. |
| 1314 | Memory, for storing encoded instructions executable by the processor 1312 |
| 1320 | Power switch/button, formed within or adjacent to button/indicator 118 |
| 1322 | Green LED, for indicating that water is ready and has been dispensed |
| 1324 | Red LED, for indicating that water is heating |
| 1330 | Signal to heat water (sent to heating element 726) |
| 1332a | Signal to drop pod lid 514 (sent to actuator 720 for rotating cam 810 to release latch formed by pod latching tab 520 and pod latching lip 522) |
| 1332b | Signal to motor 724 to open valve 722 to release water from water tank 712 at designated point in preparation sequence |
| 1334 | Signal indicating water temperature (from temperature sensor 718) |
| 1336 | Signal indicating water level (from level sensor 716) |
| 1338 | Signal indicating water has been heated to temperature |
| 1340 | Signal indicating water is being heated |
| 1350 | Speaker |
| 1352 | Bottle sensor signal |
| 1400 | Alternative implementation of system for preparing baby formula |
| 1416 | Funnel with recessed region 1418 (conveys powdered formula into bottle) |
| 1418 | Recessed region of funnel 1416, providing space within bottom circumference 1419 of funnel to receive drain spout 1420 |
| 1419 | Rounded bottom of funnel 1416 |
| 1420 | Drain spout 1420 for releasing heated water directly into bottle 140, without water passing through the funnel |

What is claimed is:

1. An apparatus for preparing baby formula, comprising: a container configured to hold an amount of water for providing no more than a single serving of baby formula and to dispense the water into a vessel;
   a removable pod for containing an amount of powdered formula premeasured to yield a single serving of baby formula, the pod having a cup, a lid, and a hinge coupling the cup to the lid for opening and closing the lid relative to the cup;
   a pod-receiving region for holding the pod in an inverted orientation with the lid facing down; and
   a moveable member configured to open the lid of the pod on command to dispense the powdered formula into the vessel.

2. The apparatus of claim 1, wherein the cup of the pod includes a transparent region that allows an operator to visually confirm whether the cup contains powdered formula when the pod is placed in the apparatus.

3. The apparatus of claim 2, wherein the transparent region is provided (i) at a bottom of the cup, opposite the lid, (ii) on a side of the cup, and/or (iii) over the entirety of the cup.

4. The apparatus of claim 3, wherein the pod-receiving region includes a shoulder in close proximity to the moveable member to resist downward movement of the cup when the moveable member opens the lid.

5. The apparatus of claim 3, wherein the apparatus further comprises a hinged top cover, the hinged top cover having an opening above the pod-receiving region, and wherein the cup of the pod extends out of the opening when the pod is placed in the pod-receiving region.

6. The apparatus of claim 5, further comprising a funnel positioned below the pod, for guiding powdered formula from the pod to a vessel.

* * * * *